(12) United States Patent
Watkins (10) Patent No.: US 6,405,448 B1
(45) Date of Patent: Jun. 18, 2002

(54) HANG PATTERN VERIFICATION TOOL (75) Inventor: Timothy M. Watkins, Javea (ES)

(73) Assignee: Industrial Powder Coatings, Inc., Norwalk, OH (US)

( * ) Notice: Subject to any disclaimer, the term of this patent is extended or adjusted under 35 U.S.C. 154(b) by 0 days.

(21) Appl. No.: 09/612,833

(22) Filed: Jul. 7, 2000

(51) Int. Cl.⁷ .......................... G01D 21/00; G01D 5/00
(52) U.S. Cl. .......................................... 33/645; 33/549
(58) Field of Search .................... 33/645, 600, 502, 33/533, 613, 549

(56) References Cited

U.S. PATENT DOCUMENTS

| | | | | |
|---|---|---|---|---|
| 4,052,793 A | * | 10/1977 | Coughlin et al. | 33/180 R |
| 4,212,108 A | * | 7/1980 | Jackson | 33/459 |
| 4,330,935 A | * | 5/1982 | Blair, Jr. et al. | 29/759 |
| 4,850,114 A | * | 7/1989 | Vockins | 33/645 |
| 5,408,189 A | * | 4/1995 | Swart et al. | 324/758 |
| 5,894,676 A | * | 4/1999 | DiGiovanni | 33/645 |
| 5,933,975 A | * | 8/1999 | Pate | 33/645 |
| 5,970,807 A | * | 10/1999 | Hsu et al. | 33/645 |

* cited by examiner

Primary Examiner—Diego Gutierrez
Assistant Examiner—Mirellys Jagan
(74) Attorney, Agent, or Firm—Fitch, Even, Tabin & Flannery (57) ABSTRACT

A verification tool for testing the orientation of arranged items relative to a predetermined orientation pattern defined by the verification tool. The verification tool is movably engageable relative to the plurality of items mounted on a rack, hanger or similar transport device, and has a fully engaged position relative to the items. The verification tool provides a visual and physical indication that the items are in the proper orientation patterns by being fully engageable relative to the items, and the verification tool provides indication that one or more items are not properly oriented by contacting the improperly oriented items to prevent the full engagement of that tool. The verification tool also includes an opening for marking the properly aligned items with identification indicia which indicate the proper relative orientation of the item in further processing or use of the item.

10 Claims, 5 Drawing Sheets

FIG. 8

HANG PATTERN VERIFICATION TOOL

BACKGROUND OF THE INVENTION

In many manufacturing applications, products, or their parts or components, must be maintained in the proper orientation relative to other products or components during the products' further processing, and in the products' final use. This is particularly a concern with products that have an asymmetrical configuration which are intended for incorporation in other assemblies or structures. If improperly oriented, such asymmetrical parts may cause manufacturing defects, assembly errors and, in some instances, potential safety hazards.

Examples of such asymmetrical products include preformed automobile or truck components, including for example, stabilizer bars that have a "left" or "right" orientation. Such auto or truck stabilizer bars typically must be maintained in the correct orientation relative to other similar or cooperating components during their post-forming processing and later end use in a completed auto or truck. It also is important that assembly line factory workers provided with such stabilizing bars can easily identify the correct orientation of the stabilizer bars to ensure their safe and correct installation in the auto or truck chassis assemblies. Other examples of asymmetrical products include door panels or other structural panels that are formed as "left" and "right" sides, as well as machine parts and similar components that are formed with an asymmetrical orientation or configuration for specific applications.

Thus, during the various stages of manufacturing processes employing such asymmetrical parts, it frequently is important to establish and maintain a predetermined spatial orientation for such parts relative to a predetermined pattern or standard. As previously mentioned, the failure to identify and maintain the proper orientation of such products can result in manufacturing errors and assembly mistakes that unnecessarily increase manufacturing and assembly costs. In certain instances, such as with the above-mentioned stabilizer bars, the incorrect installation of the product or component also may create safety hazards for the end user of the completed vehicle.

In one effort to address such concerns in the painting and finishing industry, products are loaded onto racks, hangers or other transport assemblies to move the products through various processing operations, such as paint booths, plating tanks, and the like. The racks or hangers are intended to maintain the components in a consistent orientation relative to a desired, predetermined arrangement or pattern. The spatial orientation of such parts may be relative to a two-dimensional pattern, or to a three dimensional pattern or standard depending on the application.

Thus, it is important that such parts and components are properly loaded on or attached to their carrying racks and hangers in the correct orientation relative to such predetermined patterns. For some products, including stabilizer bars, further secondary operations may be employed to apply identification markings to the products such as paint stripes, identification stickers or tape, UPC symbols, etc. It often is desirable to apply such markings to a specific section or location on the products to provide orientation information to downstream processing operations, installers, and users of the products.

One example of such a component marking operation is used with the above-mentioned auto stabilizer bars. After the bars are manufactured, but prior to installation into a vehicle, the stabilizer bars are mounted on a transport hanger or rack and marked with a paint stripe to provide a reference for the proper orientation of the product during the assembly of the applicable vehicle chassis.

In such applications, as with other complexly shaped products, it can be difficult to determine the proper orientation of asymmetrical stabilizer bars causing frequent errors in mounting the bars onto product hangers or racks. Such errors include a failure to correctly visually ascertain the proper orientation of the stabilizer bar relative to the other bars or to a preestablished standard pattern. As a result, the improperly mounted bars are not properly marked with the paint striping and further can be improperly processed or subject to downstream treatments that are incorrectly applied because the bars are not in the proper orientation. Moreover, the incorrect paint striping of the bars leads to further errors and slow downs during the installation of the bars in autos and trucks.

The invention discussed below addresses the problem of improperly orienting products on a hanger, rack or other transport assemblies during a manufacturing or an assembly processes. The invention provides a verification tool and method for identifying and verifying the correct orientation and arrangement of products, parts or components, including asymmetrical parts or components, relative to a predetermined pattern or standard defined by the verification tool.

SUMMARY OF THE INVENTION

The verification tool of the invention provides an efficient, cost effective and easy to operate device and method for quickly determining whether products, or parts or components of products, retained or attached to a hanger, rack, or other transport assembly are properly oriented relative to a predetermined pattern or standard. The verification tool provides both a visual and a physical confirmation of the proper orientation of such products. The tool further provides an immediate visual and physical warning of the improper orientation of one or more of such products, and in one aspect a visual identification of the mis-positioned products. The tool, in addition, effectively provides these functions without the need for complicated mechanical or electronic apparatus and can be operated with a minimal amount of training and instruction.

In one aspect, the verification tool includes a tool body that is movable from a first position to a second position in engagement with products retained on a rack, hanger or other transport assembly. The tool body is provided with sets of opposing pins, walls, segments or similar elements extending from the tool body and defining channels or orientation spaces which conform to a predetermining orientation pattern or standard for the products. The opposing pins or similar elements are sized and disposed to conform the channels or spaces to the products' outer dimensions and to accommodate the products in the channels or spaces.

The pins or similar elements further may be arranged in any pattern necessary to provide the proper orientation of the products and further may extend from the tool body at variable lengths to establish a pattern suitable to accommodate even very complex, three dimensional product configuration and dimensions. Moreover, the tool body may be provided with a sufficient number of sets of pins or similar elements to correspond to each individual product disposed on a rack, hanger or other transport device.

When the tool is in its first position it can be properly positioned and aligned relative to the products, and when moved to its second, engaged position, the full and complete engagement of the tool with the products provides the above-mentioned visual and physical indication that the products are properly oriented with respect to the predetermined pattern or standard, i.e., all of the products are accommodated within the tool between the pin surfaces or other elements. The pins or elements further are positioned to contact and prevent the movement of the tool to its fully engaged position if one or more products are positioned in an incorrect orientation relative to the pre-determined pattern or standard. Thus, the tool provides similar visual or physical indication that the products are improperly oriented and must be repositioned as established by the inability of the user to move the tool to its second, fully engaged position.

In another aspect, the tool is provided with an attachment section sized to overlap one or more portions of the hanger or rack holding the products to provide a pivoting connection between the tool and the hanger or rack. The tool, as a result, may be maintained in the proper alignment with the products and may be rotated from its first unengaged position to its second engaged position along that pivoting connection.

In yet another aspect, the tool includes an opening extending across one portion of the tool body to provide a template for the application of a marking or orientation stripe to one or more portions of the products when the tool is in its second, engaged position. The markings are positioned to indicate and identify the products' proper orientation relative to the predetermined pattern or standard. In another aspect, the verification tool is transparent or partially transparent so that further visual confirmation of the products' orientation is provided.

The verification tool also provides a method for simultaneously verifying that a number of products, and particularly asymmetrical products, are arranged in a predetermined desired orientation and for concurrently marking the products to identify their proper orientation relative to the predetermined pattern or standard. The method includes the steps of arranging the products on a suitable rack, hanger or transport assembly and engaging the verification tool with the products to confirm that the arrangement of items conforms to the predetermined desired relative orientation. The method further includes the step of marking the products with indicia, such as a paint stripe, while the verification tool is in an engaged position to identify the products' relative orientation for use in subsequent manufacturing or processing steps.

DETAILED DESCRIPTION OF ONE ASPECT Of THE INVENTION

Figure 1:
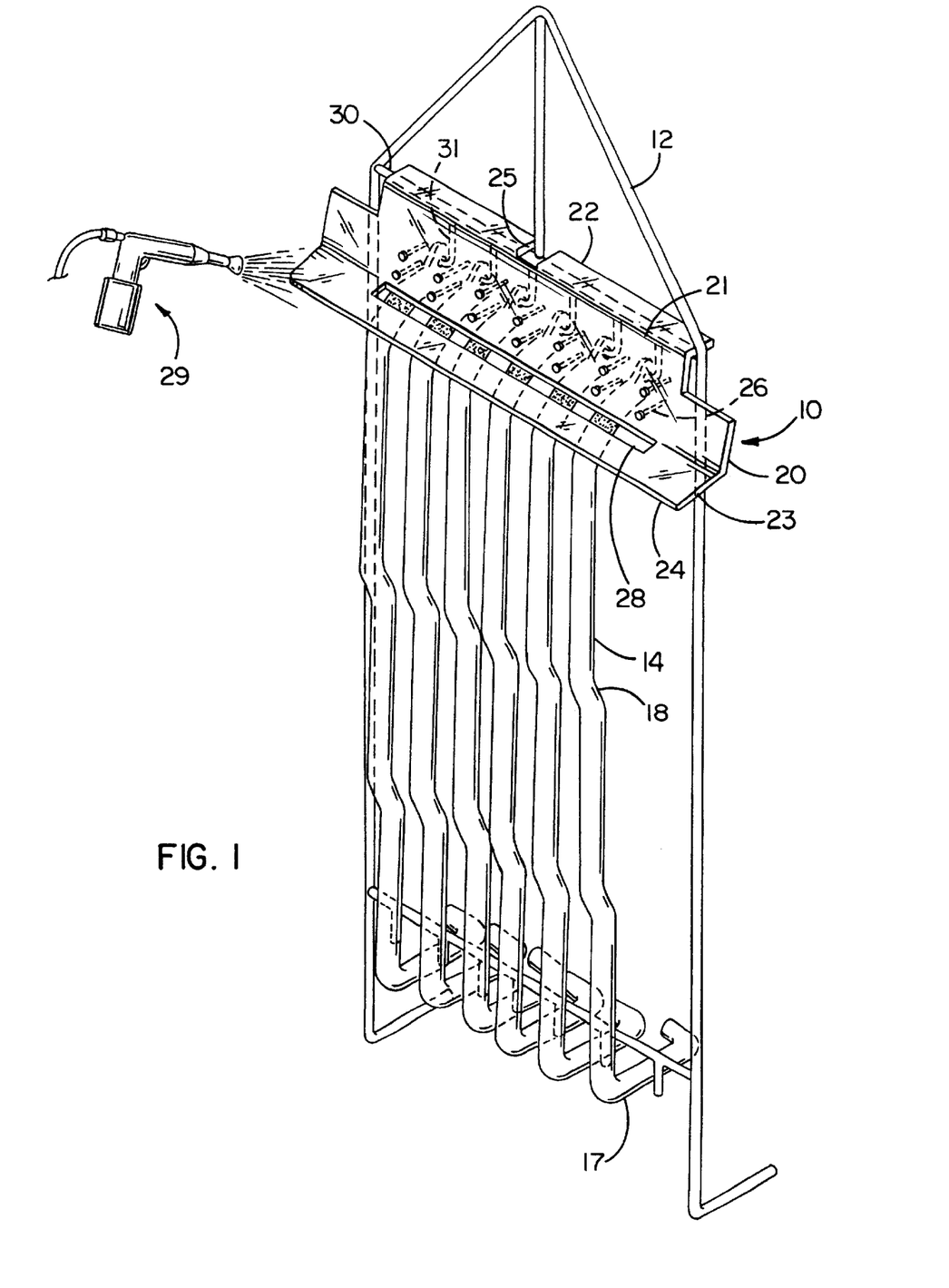
FIG. 1 shows a perspective view of a verification tool in accordance with a first embodiment of the invention used with auto or truck stabilizer bars. A paint sprayer marking appropriate portions of the bars with visible orientation indicia also is shown.
Figure 2:
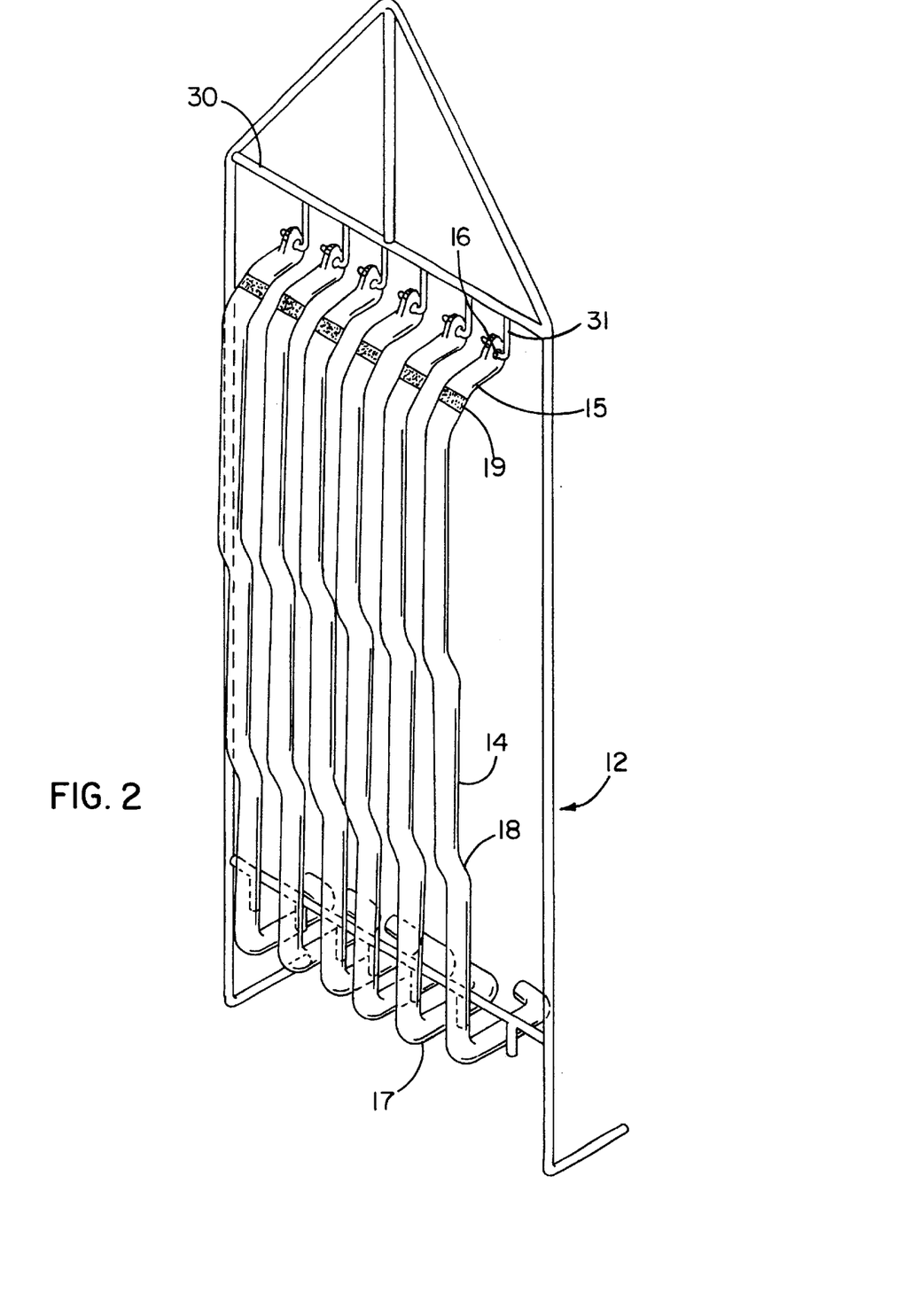
FIG. 2 shows a perspective view of the hanger and stabilizer bars shown in FIG. 1 after the bars have been marked with orientation indicia and the verification tool has been removed from the hanger.

Referring to the figures generally, and particularly to FIGS. 1 and 2, a verification tool 10 in accordance with the invention is shown being applied to a hanger 12 with a number of stabilizer bars 14 mounted on the hanger 12 to illustrate one aspect of the invention. The hanger 12 includes a generally horizontal hanger bar 30 from which a number of mounting hooks 31 descend. Each of the hooks 31 is positioned and configured to hold a stabilizer bar 14 thereon by engaging an aperture 16 at the hanging end 15 of each stabilizer bar 14. The apertures of the bars 14 may be manually registered with the hooks 31 and passed over the ends of the hooks 31 to hang them therefrom. In other applications, the bars also may be mounted using automated systems.

As illustrated in the figures, such stabilizer bars often have a complex, asymmetrical three-dimensional shape, even while retaining a very general linear overall configuration. In particular, one form of the stabilizer bars 14 include a hanging end 15 for hanging from the hooks 31 and an opposing free end 17. In between the ends, the stabilizer bar 14 may have several asymmetrical, nonlinear and/or non-parallel segments 18. In particular, the nonlinear segments 18 may be noncoplanar and thereby defining a three-dimensional shape.

Such nonlinearities, important as they may be to the function of the bars once installed in the vehicle, are often difficult to discern and may be fairly small relative to the general linear form of the bars 14. As a result, it can be difficult for workers hanging individual bars 14 on the hanger 12 to orient each bar identically and in the proper position relative to a predetermined hanging pattern.

Such patterns are developed to take into account the size and shape of a product, the configuration of the various portions of the product, any desired positioning of the products for further processing or manufacturing operations, and the workplace and cost efficiencies that may be obtained by the use of a particular hang or transport pattern. As explained above, for example, a predetermined orientation pattern or standard may be used to properly and relatively uniformly position asymmetric products, such as stabilizer bars, to receive stripes or other markings indicating the orientation of the product. Similar concerns also may apply to symmetrical products, or any product which must be maintained in a particular orientation.

The use of such patterns or standards is particularly useful when used with an on-line marking process. If properly oriented relative to a predetermined pattern, the products will all be marked relatively uniformly with such positioning markings. If products, such as stabilizer bars, are improperly oriented, they will be incorrectly marked leading to errors in the subsequent installation of the bars 14 into vehicles.

In the aspect illustrated in the figures, the verification tool 10 includes a transparent or translucent engagement body 20 having a number of pins 26 extending therefrom. The pins 26 are arranged to correspond with the overall outer dimensions and configuration of the products, which in this instance are the asymmetrical stabilizer bars 14. The pins 26 further are arranged and oriented relative to the tool body 20 and the other pins 26 to provide surfaces defining a channel or space to accommodate the bars 14 therein, and to maintain the individual bars 14 in the correct relation to a predetermined orientation.

In order for the pins 26 to correctly align with the stabilizer bars 14, the tool 10 preferably is provided with a reference element incorporated in the tool body 20. The reference element engages the hanger structure 12 to allow the tool user to maintain the tool 10 in the proper position with respect to the bars 14, which in turn properly orients the pins 26. The reference element may engage the hanger bar 30 of the hanger 12, or may engage another structural element of the hanger 12, such as a bar end, a flange, post, groove or other similar element provided for that purpose.

In the embodiment of FIGS. 1–6, the tool body 20 is provided with a first section 22 extending from a top edge 21 of the body 20 and a second section 24 extending generally oppositely to the first section 22 from the bottom perimeter 23 of the body 20. The first section 22 is formed to provide the above-mentioned reference element. The first section 22 includes a notch 25 for accommodating the structure of the hanger 12, and generally is placed over the hanger bar 30 of the hanger 12. As a result, the hanger bar 30 fits into the angle formed between the body 20 and the first section 22 (as shown more clearly in FIGS. 4 and 6), to rest on the hanger bar 30 and thereby align the tool 10 with respect to the stabilizer bars 14, and also to form a pivoting engagement with the hanger bar 30.

Figure 6:
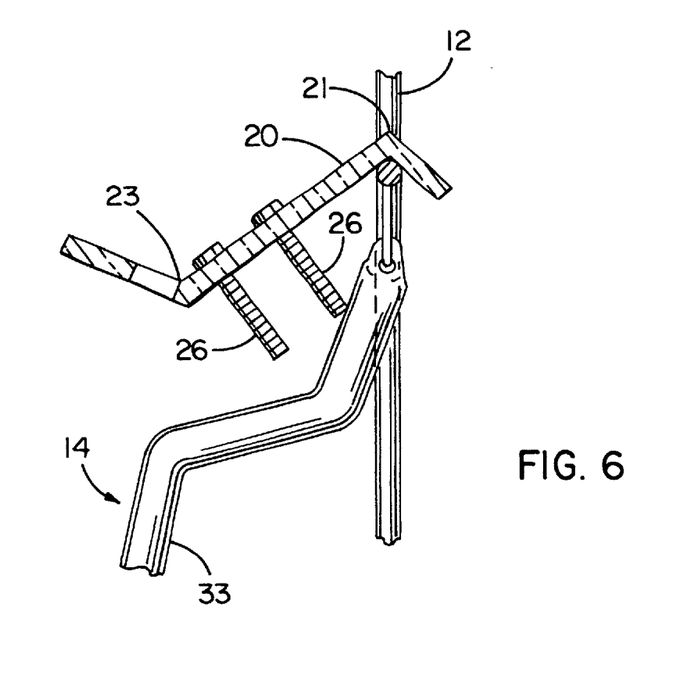
FIG. 6 shows a side elevation view of the verification tool, hanger, and stabilizer bars shown in FIG. 5 wherein the verification tool is in a first unengaged position and the pins projecting from the engagement surface are contacting the misorientation bars preventing the further engagement of the tool.

In one application, the verification tool 10 initially will be placed on the hanger bar 30 so that the tool body 20 is at an angle greater than that shown in FIG. 6 relative to the general plane of the hanger 12. This represents a first, unengaged position for the verification tool 10 because it is not in a position to fully engage and confirm the proper orientation of the set of stabilizer bars 14 hanging from the hanger 12.

The verification tool 10 then is rotated about the hanger bar 30 along the pivoting engagement with the tool first section 22. As the tool body 20 and the general plane of the hanger 12 approach a parallel position, the pins 26 approach and pass between the bars 14 to accommodate the bars 14 between the pins 26 when the bars 14 are properly oriented. The rotation of the tool 10 continues until either the tool body 20 or the tool second section 24 contact one or more of the properly oriented stabilizer bars 32 or the hangar 12 (i.e., full engagement).

In an alternative use, the tool 10 may be pushed toward the hanger 12, without rotation, until the tool 10 is in its fully engaged position, including engagement with the hanger bar 30. In that application, the tool body first section 22 also contacts and engages the hanger bar 30 to maintain the proper alignment of the tool 10 relative to the bars 14.

Figure 3:
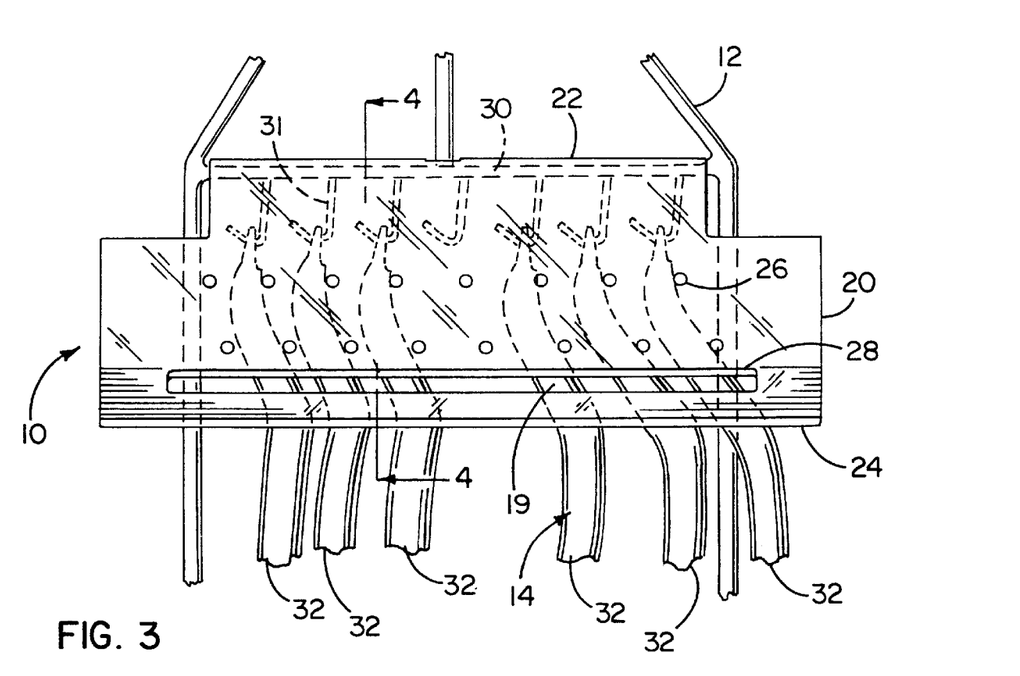
FIG. 3 shows a close-up front view of the verification tool of FIG. 1 with the verification tool in its second, fully engaged position over the stabilizer bars and rack shown in FIG. 1.
Figure 4:
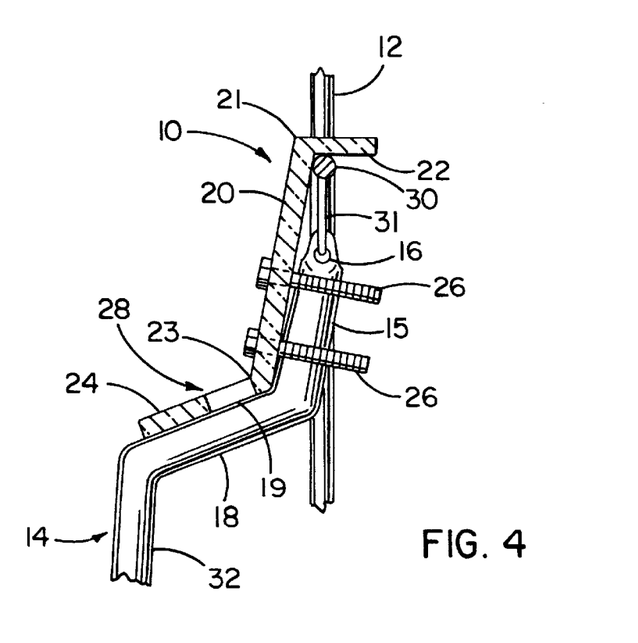
FIG. 4 shows a side view elevation view of the verification tool, hanger, and stabilizer bars of FIG. 3 with the verification tool in its second, fully engaged position.
Figure 5:
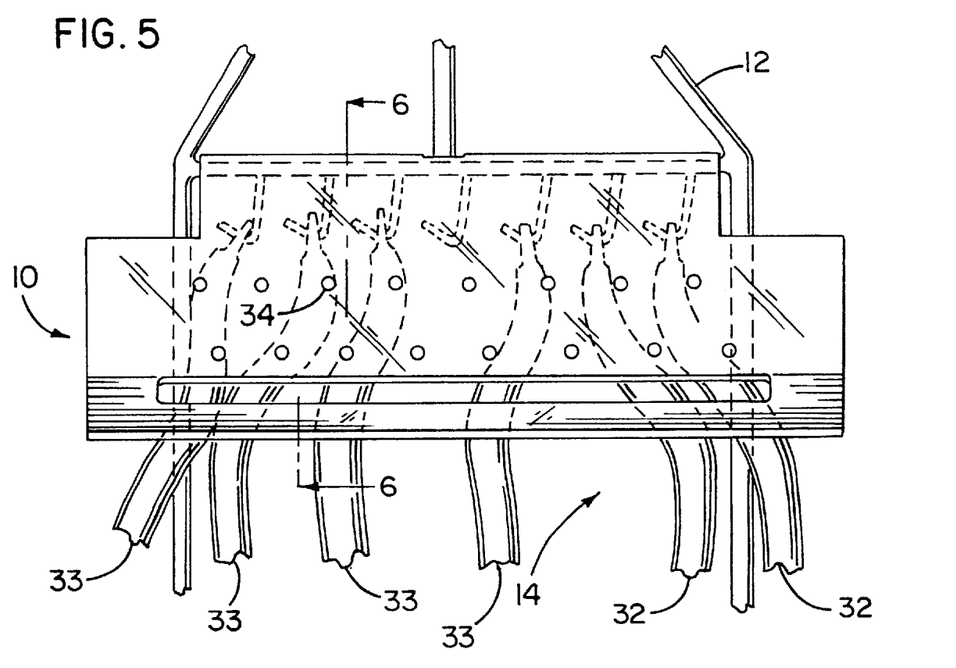
FIG. 5 shows a close-up front view of the verification tool, hanger and stabilizer bars shown in FIG. 3 with the stabilizer bars improperly disposed in incorrectly oriented positions.

Comparing and contrasting FIGS. 3 and 5 and their counterparts, FIGS. 4 and 6, the positioning of the stabilizer bars 14 can be seen through the transparent or translucent engagement body 20 of the verification tool 10. In FIG. 3, the stabilizer bars 14 are all hanging in generally the same, proper orientation, and the properly oriented bars 32 are accommodated between the pins 26 to visually indicate and preserve the proper orientation of the bars 32. In some embodiments of the invention, additional rotational or lateral movement of the verification tool 10 or stabilizer bars 14 may be required to achieve full engagement of the tool 10.

In contrast, if the bars 14 are improperly oriented, the movement of the tool 10 is prematurely obstructed as one or more of the pins 26 contact one or more of the stabilizer bars 14. When one or more pins 26 contact a stabilizer bar 14, this is indicative that one or more of the stabilizer bars is not positioned in the proper predefined orientation. Thus, as shown in FIG. 5, the verification tool provides a visual indication that there is at least one improperly oriented and positioned stabilizer bar 33 (shown on the left portion of the hanger).

The visual indication of improper orientation is confirmed by the physical inability to move the tool 10 to its fully engaged position due to the physical contact and interference between the pins 26 with the improperly oriented stabilizer bars 33. Those improperly oriented stabilizer bars 33 do not fall within the pattern defined by the pins 26 causing such contact.

Furthermore, in this aspect, the use of a transparent tool body 20 allows the user to visually determine which of the products, stabilizer bars 32 and 33, are properly oriented and which are improperly oriented. As shown in FIG. 5, it is readily apparent by viewing the bars through the tool 10 that the bars 32 are properly oriented and the bars 33 are improperly oriented. As a result, the tool 10 can be quickly removed and the bars 33 repositioned in the correct orientation.

It should be noted that the predefined orientation of the products established by the verification tool need not require that the bars or other products are arranged identically and the same orientation. In some applications, it may be desirable to have products arranged in a non-uniform orientation, and, consequently, the projecting pins 26 or other projections defining the channels or orientation spaces for receiving such products will be disposed in a corresponding non-uniform orientation pattern. For example, a tool 10 may be designed to orient products in both a "left" and a "right" orientation, and different sets of the pins 26 would be positioned to separately define "left" and "right" channels or orientation spaces.

In the aspect shown in the Figures, the predetermined acceptable channel or orientation spaces are defined by the pattern of pins 26, disposed in sets proximate to the sides of the bars 14, generally in conformance with the outer dimensions and configuration of the bars 14 when they are properly mounted on the hanger 12. The degree of conformance with those product dimensions may be adjusted to reflect the complexity of the product shape and. difficulty in determining its orientation. This illustrates the ability of the tool 10 to conform the orientation surfaces and spaces provided by the pins 26 or similar elements to asymmetrical products, and even those products with a relatively difficult to discern asymmetrical configurations.

As also shown in FIGS. 1, 4 and 5, the pins 26 also typically extend in a direction normal from the tool body 20 to define the orientative spaces and patterns. The pins 26, in addition, can extend from the tool body 20 at other angles depending on the dimensions and configuration of the products that will be used with the tool and the desired orientation patterns. Similarly, FIGS. 3 and 5 show a staggered, two-row pattern for the arrangement of the pins 26. Alternative arrangements and orientations of the pins may be used depending on the configuration of the products at issue and the desired predetermined orientation pattern.

The pin pattern shown in FIG. 3 provides each hook 31 with its own set of verification pins corresponding to a bar 14 hung from the hook 31. Consequently, the failure to fill each hook 31 with a separate bar 14 does not affect the ability of the verification tool to establish and identify the orientation of the bars 14 that are present on the hanger 12 at the remaining hook location.

The pins 26, in addition, may be attached to the engagement face in any manner, such as by screwing through internally threaded holes in the engagement face, the use of washers and nuts, by the use of adhesives, or with other fastening approaches. Similarly, a single tool 10 may have multiple openings or pin mountings to permit the alteration of the pin patterns to accommodate a variety of product shapes and orientation patterns. Thus, a verification tool 10 can be adaptable to a variety of different systems, products, product configurations, shapes and uses.

As also shown in the Figures, when employed on the tool 10, the pins 26 cumulatively act to define the orientation surfaces and channels where positioned to accommodate the stabilizer bars 14, 32 or 33 and indicate their orientation, relative to the predetermined pattern or standard. Notably, the pins 26 have a predetermined length, which also can be adjusted to define a variety of channels or. orientation spaces. The use of pins 26 disposed at more than one angle with respect to the tool body provides further flexibility to define a channel or orientation space that can be used to create a complex three-dimensional orientation pattern.

In other applications, projecting walls and surfaces may be provided as alternatives to the pins of the embodiment of FIGS. 1–6. The projecting walls or surfaces similarly may be arranged to define channels or orientation spaces corresponding to the dimensions and configuration of the products which will be the subject of the tool. The edges or surfaces of such walls or structures, like the pins 26, will contact and will not permit the full engagement of the tool 10 with the rack or bars when the products are incorrectly oriented. Such projecting walls and other structures may be attached to the tool body or may be integrally molded with the tool body. In addition, such a tool body similarly may be provided with multiple opening and/or attachment sites to allow for the alteration of the orientation patterns on the tool.

Figure 7:
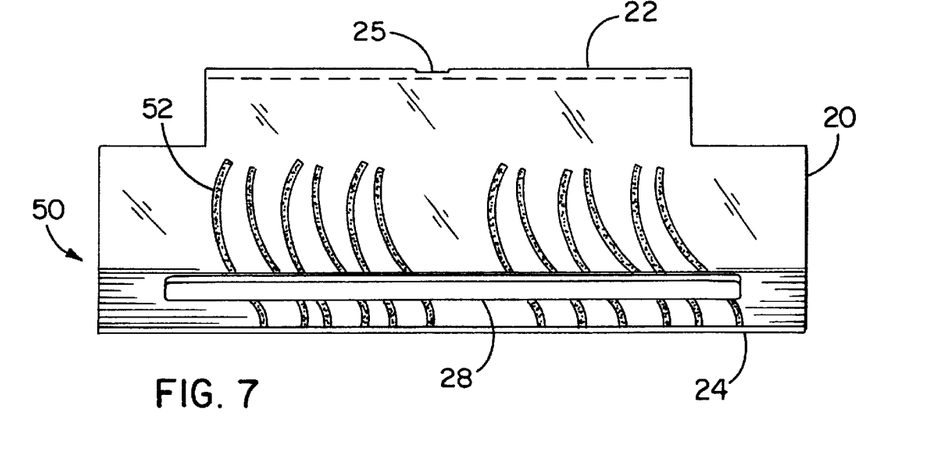
FIG. 7 shows a close-up front view of a verification tool in accordance with a second embodiment of the verification tool while utilizing a visual verification pattern applied to the tool to assist in orientation of stabilizer bars.

FIG. 7 depicts an alternative aspect of verification tool 50 having curved markings 52 applied to the tool body 20. In that aspect, the markings are positioned to overlie the properly oriented bars 14 to provide further indicia of correct product orientation. When the bars 14 are properly oriented, they will be positioned under or in accordance with the markings 52.

Both aspects of the verification tool, 10 and 50, shown in the figures also include a paint strip slot 28 running across the second section 24 thereof. The paint strip slot 28 permits the verification tool 10 and 50 to be used as a mask or template for painting or otherwise marking properly oriented products such as the bars 14 with visible stripe or other indicia confirming the proper positioning and orientation of the product in subsequent treatment or assembly operations. Similarly, such a mask or template may be used to establish a zone for the application of identification numbers or symbols, identification tape, bar coding symbols, etc., As shown in FIGS. 1 and 2, for example, when the verification tool 10 is in its fully engaged position with respect to the properly oriented stabilizer bars 14, a paint sprayer 29 may be used to spray paint through the slot 28 to mark a predetermined paint stripe location 19 on the stabilizer bars 14. The paint stripe is then used by a person installing the stabilizer bar in a vehicle chassis to distinguish the hanging end 15 from the free end 17 of the bar 14 and the proper "left" or "right" orientation of the bar 14. The size and shape of such a paint strip slot also may be altered for specific applications. Other similar templates or guides also may be formed in the tool body for such purposes.

Figure 8:
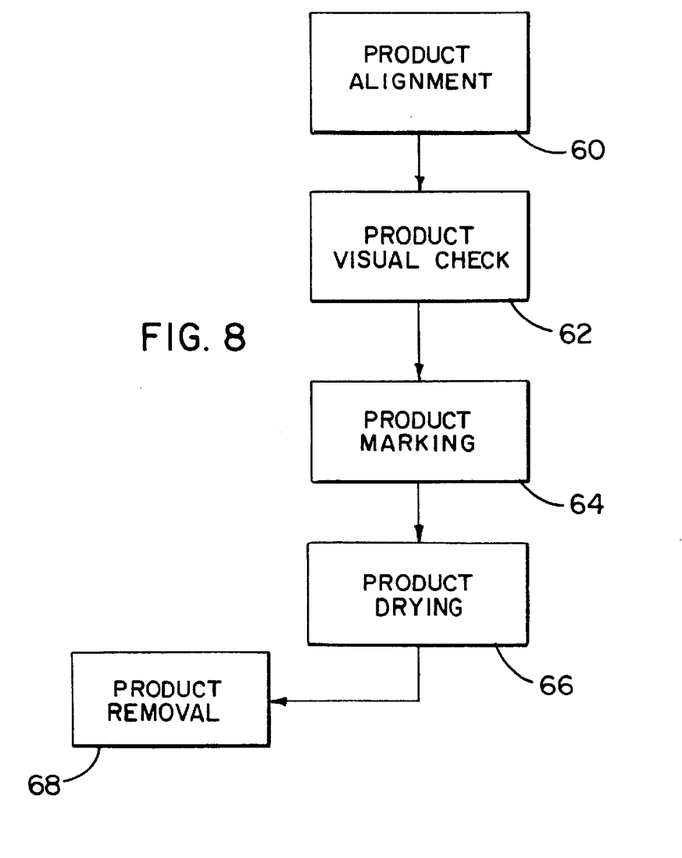
FIG. 8 shows a process flow diagram indicating steps taken in the use of the verification tool in accordance as applied to distinct products requiring a predefined orientation.

As seen in FIG. 8, one aspect of the method of the invention is provided in a block diagram form. In the first step 60, a set of components is mounted and oriented on a hanger or rack; in a second step 62 a verification tool 10 in accordance with the invention is used to visually and/or physically confirm the proper orientation of the components; in a third step 64 the components are consequently or sequentially marked using the verification tool 10 as a mask; in a fourth step 66 the products are dried or permitted to dry; and in a fifth step 68 the components are removed from the hanger or rack for subsequent processing or ultimate use.

The manner in which the verification tool is engageable relative to the products at issue also may be other than by rotation about a hanger bar. The manner of engagement of the tool further may be manual or automated, and the tool also may be only partially transparent or may be opaque. In the opaque or partially opaque embodiment, the tool body 10 also may be provided with viewing ports permitting the user to visually identify all properly or improperly oriented products. The automation of the verification tool may be accomplished through the powered movement (i.e. through electric motors, pneumatic actuators etc.) of the tool from its unengaged to its fully engaged position. The relative position of the tool, as it is moved toward the fully engaged position, may be monitored by appropriate proximity, photoelectric, electronic or other sensing systems. Such a system may be controlled and monitored by microprocessors or other equivalent control systems to provide data analysis and output for the system, including any necessary alarms.

As may be appreciated from the foregoing description, the verification tools and methods of the invention provide significant advantages over the traditional method of orientation verification, simple visual analysis without convenient point of reference. The verification tool provides an easy-to-apply mechanical verification that, unlike its traditional counterpart, does not become more prone to error with the human fatigue or tedium that may accompany the repetitive task of hanging and/or orienting components.

The invention is not limited to the embodiments described herein or to any particular embodiment. In particular, and without limitation or exclusion, the invention is considered to include verification tools may be configured substantially differently from those shown in the figures. Furthermore, while the invention is described with reference to asymmetrical parts, it also can be used for symmetrical parts, and other parts or components that must be properly oriented for further processing or further down-line applications.

What is claimed is:

1. A verification tool for testing the orientation of one or more products retained on a transport carrier, the carrier provided with at least one generally exposed structural member, and the products having preestablished asymmetrical outer dimensions, said verification tool comprising:

a tool body with at least one edge, an inner surface and an outer surface, an engagement section formed along the tool body edge and at least one set of orientation surfaces extending from the tool body inner surface;

the tool body engagement section shaped to overlap the exposed structural member of the carrier and form a pivoting connection between the carrier and the tool body, the tool body rotatable from a first position to a second, engaged position along the pivoting connection;

each set of orientation surfaces formed of at least two, spaced, opposing rows of stationary pins, the pins disposed to generally correspond to the outer dimensions of the product and to correspond to a predetermined orientation pattern;

the orientation surfaces of the opposing rows of pins spaced apart a distance sufficient to accommodate the product therebetween when the product is disposed on the carrier in an orientation corresponding to the predetermined orientation pattern and the tool is moved from its first position to its second, engaged position; and the pins positioned to contact the product when it is improperly oriented relative to the predetermined orientative pattern,on the carrier relative to the preventing the tool from moving from its first position to its second engaged position.

2. A verification tool of claim 1 wherein each set of pins are positioned in a spaced pattern corresponding to the three dimensional configuration of the asymmetrical products.

3. A verification tool in accordance with claim 2 wherein the tool body engagement section is disposed to overlap one or more horizontal structural members of the carrier; the engagement section comprising a first segment extending generally normal to the tool body; the first segment having a length a sufficient to accommodate the horizontal structural member of the carrier therebetween and in a pivoting relationship with the tool body.

4. The verification tool of claim 3 wherein the tool body is provided with a second edge portion, a second segment extending a predetermined distance from the tool body second edge portion at an angle of less than 90 degrees, the second segment provided with an opening having a length and width sized to pass marking media therethrough in an amount effective to provide a visible mark on a surface of one or more products located between the tool body pins in the correct orientation when the tool body is in it second engaged position.

5. A verification tool in accordance with claim 4 wherein said verification tool is provided with a viewing area positioned to permit visual confirmation of the orientation of the products relative to said predetermined pattern of pins.

6. A verification tool in accordance with claim 5 wherein the view area is provided with markings indicating the proper alignment of the tool and the proper orientation of the products.

7. A method for simultaneously verifying that a plurality of identical items are arranged in a predetermined allowable orientation and jointly marking said plurality of items in a predetermined location on said items, said method comprising the steps of:

arranging said plurality of items relative to a structure;

engaging a verification tool with said plurality of items to confirm that the arrangement of said items conforms to said predetermined allowable orientation;

jointly marking said plurality of items while said verification tool is engaged with said plurality of items; and removing said plurality of items from said arrangement relative to said structure.

8. A method in accordance with claim 7 further comprising a drying step for said plurality of items prior to removing said plurality of items from said arrangement.

9. A verification tool for testing the orientation of one or more products having predetermined outer dimensions, said verification tool comprising a tool body moveable from a first position to a second, engaged position with one or more sets of orientation surfaces, a set of orientation surfaces disposed in an opposing relation to each product; each set of orientation surfaces extending from the tool body defining a space therebetween conforming to the outer dimensions of the product; and the spacing of the orientation surfaces sufficient to accommodate the product between the surfaces when the product is oriented in a predetermined orientation pattern when the tool is moved from its first position to its second engaged position, and the orientation surfaces further positioned to contact the product when the product is improperly orientated to prevent the tool from moving from its first to its second position, wherein said verification tool body includes a slot therein sized to permit the transmittal of marking materials therethrough to a portion of the products when the tool is in its second, engaged position.

10. A verification tool for testing the orientation of one or more products having predetermined outer dimensions, said verification tool comprising a tool body moveable from a first position to a second, engaged position with one or more sets of orientation surfaces, a set of orientation surfaces disposed in an opposing relation to each product; each set of orientation surfaces extending from the tool body defining a space therebetween conforming to the outer dimensions of the product; and the spacing of the orientation surfaces sufficient to accommodate the product between the surfaces when the product is oriented in a predetermined orientation pattern when the tool is moved from its first position to its second engaged position, and the orientation surfaces further positioned to contact the product when the product is improperly orientated to prevent the tool from moving from its first to its second position, wherein the tool is provided with a first section for cooperating with a hanger on which the products are mounted providing rotational movement of the verification tool relative to the hanger.

* * * * *

UNITED STATES PATENT AND TRADEMARK OFFICE
CERTIFICATE OF CORRECTION

PATENT NO.    : 6,405,448 B1
DATED         : June 18, 2002
INVENTOR(S)   : Timothy M. Watkins It is certified that error appears in the above-identified patent and that said Letters Patent is hereby corrected as shown below:

Column 9,
Line 20, change "pattern,on" to -- pattern on --.

Signed and Sealed this

Eighteenth Day of February, 2003

JAMES E. ROGAN
Director of the United States Patent and Trademark Office